US011967683B2

United States Patent
Duan et al.

(10) Patent No.: US 11,967,683 B2
(45) Date of Patent: Apr. 23, 2024

(54) INTELLIGENT VEHICLE BATTERY CHARGING FOR HIGH CAPACITY BATTERIES

(71) Applicant: Ford Global Technologies, LLC, Dearborn, MI (US)

(72) Inventors: Xiaohong Duan, Canton, MI (US); Yanan Zhao, Ann Arbor, MI (US); Robert Taenaka, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/880,029

(22) Filed: Aug. 3, 2022

(65) Prior Publication Data

US 2022/0376313 A1 Nov. 24, 2022

Related U.S. Application Data

(62) Division of application No. 16/741,382, filed on Jan. 13, 2020, now Pat. No. 11,417,916.

(51) Int. Cl.
*H01M 10/42* (2006.01)
*B60L 58/12* (2019.01)

(52) U.S. Cl.
CPC ......... *H01M 10/4257* (2013.01); *B60L 58/12* (2019.02); *H01M 2220/20* (2013.01)

(58) Field of Classification Search
CPC .......... H01M 10/4257; H01M 2220/20; B60L 58/12; B60L 53/126; B60L 53/66; B60L 53/68; B60L 58/16; B60L 50/60; B60L 53/14; B60L 58/24; Y02T 90/12; Y02T 90/167; Y04S 30/12
See application file for complete search history.

(56) References Cited

U.S. PATENT DOCUMENTS

| 7,849,944 | B2 | 12/2010 | DeVault |
| 8,981,717 | B2 | 3/2015 | Hayashi et al. |
| 9,248,756 | B2 | 2/2016 | Chen et al. |
| 9,306,412 | B2 | 4/2016 | Yokoyama et al. |
| 10,077,040 | B2 | 9/2018 | Chen et al. |
| 2003/0189498 | A1* | 10/2003 | Kakihara ............... G07B 15/02 340/928 |

(Continued)

FOREIGN PATENT DOCUMENTS

CN 107776417 A * 3/2018 ............. Y02T 10/70

*Primary Examiner* — Tung S Lau
(74) *Attorney, Agent, or Firm* — Brooks Kushman PC; David B. Kelly

(57) ABSTRACT

A system and method for intelligent battery charging management to improve battery life and charging efficiency of high capacity batteries that may not be deeply discharged on a regular basis may learn driving habits automatically and/or with user input and select an ending state-of-charge (SOC) to limit battery charging to less than maximum capacity based on current and/or anticipated ambient temperature and battery health of life (HOL). An expected vehicle travel distance before the next charge may be learned or determined based on vehicle or user inputs. An ending SOC based on battery temperature, a delta SOC to meet propulsive energy for the expected travel distance, cycling effect (depth of discharge) on battery HOL for a given delta SOC, and/or battery working efficiency may be used to control charging of the vehicle battery.

15 Claims, 5 Drawing Sheets

(56) References Cited

U.S. PATENT DOCUMENTS

| | | | |
|---|---|---|---|
| 2010/0305779 A1* | 12/2010 | Hassan | H04B 7/0608 |
| | | | 701/2 |
| 2011/0224868 A1* | 9/2011 | Collings, III | G07C 5/085 |
| | | | 701/33.4 |
| 2014/0347008 A1* | 11/2014 | Chae | H02J 50/402 |
| | | | 320/108 |
| 2015/0095114 A1* | 4/2015 | Hyde | B60L 58/40 |
| | | | 705/7.38 |
| 2016/0001663 A1* | 1/2016 | Chae | H02J 50/90 |
| | | | 307/104 |
| 2017/0004712 A1* | 1/2017 | Yang | H04L 67/025 |
| 2017/0324279 A1* | 11/2017 | Kang | H02J 50/80 |
| 2018/0164801 A1* | 6/2018 | Kim | G05D 1/0033 |
| 2018/0278099 A1* | 9/2018 | Hong | H04B 5/0037 |
| 2019/0037173 A1* | 1/2019 | Lee | G06F 3/04842 |

\* cited by examiner

INTELLIGENT VEHICLE BATTERY CHARGING FOR HIGH CAPACITY BATTERIES

CROSS-REFERENCE TO RELATED APPLICATION

This application is a divisional of U.S. Ser. No. 16/741,382 filed on Jan. 13, 2020, the disclosure of which is hereby incorporated by reference in its entirety.

TECHNICAL FIELD

This disclosure relates to systems and methods for intelligent battery charging management to improve battery life and battery operating efficiency including charging and discharging efficiency while the vehicle is driving for high capacity electrified vehicle batteries that may not be deeply discharged on a regular basis.

BACKGROUND

Electrified vehicle driving range has increased over the last several years and may eventually alleviate driving range anxiety to improve electrified vehicle adoption rates. At least one study has predicted that electric vehicle range will average 275 miles by 2022, and 400 miles by 2028. The increased driving range has resulted from various improvements in battery technology and vehicle efficiency, including strategies for vehicle operation as well as battery charging to meet consumer expectations with respect to charging times, vehicle range, battery life, etc.

A variety of charging strategies intended to improve battery life or charging efficiency have been developed. A self-learning control system for plug-in hybrid electric vehicles (PHEVs) having lower capacity batteries (e.g. about 20 miles) that spend the majority of operation in a discharged state, such as used for short commutes, charges the vehicle battery via engine operation so that the battery is discharged just prior to arrival at a charging station, as disclosed in U.S. Pat. No. 7,849,944, for example.

Another strategy determines a usage pattern of an electric vehicle including the amount of power consumption of a battery on each day of the week. When the vehicle goes home after one day's operation and is connected to a charging apparatus, a charge determination unit predicts a usage pattern of the vehicle on the next day and determines whether the vehicle can operate on the next day with the remaining amount of power of a battery in the vehicle. When it is determined that the charging of the battery is necessary, the battery is charged until it reaches the target remaining amount of power. The target remaining amount of power is determined on the basis of the amount of power consumption in the predicted usage pattern so that a full charge (to maximum SOC) is prevented and the number of charges is reduced, such as disclosed in U.S. Pat. No. 8,981,717, for example.

An electrified vehicle may also include a control strategy that charges the battery to less than the maximum state-of-charge (SOC) to provide additional charging during operation of the vehicle, such as in anticipation of a regenerative braking event when the vehicle is charged at the top of a hill, grade, or higher elevation than anticipated operation, such as disclosed in U.S. Pat. No. 9,248,756, for example.

Charging cost or operation efficiency may be improved by determining a target SOC for charging based on driver habits based on a statistical analyzer, an estimation module, and a determination module where the statistical analyzer analyzes a set of data describing utility rate information and one or more behaviors of the vehicle, the estimation module estimates driving tendency parameters, and the determination module determines a charging setting including a target charging battery SOC, a charging start time, and a charging end time, such as disclosed in U.S. Pat. No. 9,306,412, for example.

While various electrified vehicle charging strategies have been described in the prior art, they do not appear to consider the effects of the charging and operating strategies on long-range or high-capacity vehicle batteries, particularly those typically operated on short-range trips between charges.

SUMMARY

A system and method for intelligent battery charging management to improve battery life and operating (charging and discharging) efficiency of high capacity batteries that may not be deeply discharged on a regular basis may learn driving habits automatically and/or with user input and select an ending state-of-charge (SOC) to limit battery charging to less than maximum capacity based on current and/or anticipated ambient temperature and battery health of life (HOL). An expected vehicle travel distance before the next charge may be learned or determined based on vehicle or user inputs. An ending SOC based on battery temperature, a delta SOC to meet propulsive energy for the expected travel distance, cycling effect (depth of discharge) on battery HOL for a given delta SOC, and/or battery operating efficiency may be used to control charging of the vehicle battery.

In one or more embodiments, an electrified vehicle includes a traction battery configured to be charged from an external power source, a vehicle charger configured to control charging of the traction battery from the external power source, a transceiver configured to wirelessly transmit vehicle trip data to an external computing device, a human-machine interface (HMI), and a controller in communication with the vehicle charger, the transceiver, and the HMI, the controller configured to communicate a target state-of-charge (SOC) less than 100% SOC to the vehicle charger during charging of the traction battery, the target SOC based on at least an expected vehicle travel distance before a next battery charge from the external power source. The target SOC may be further based on temperature and a traction battery health of life (HOL) estimate. In one or more embodiments, the target SOC may be determined from a minimum target SOC and an SOC that depends on the vehicle expected travel distance. The minimum target SOC may be calculated using the SOC necessary to provide a predetermined discharge power for the vehicle, at the anticipated temperature, and an additional SOC to provide a travel distance margin or cushion. The temperature may be an estimated temperature of the traction battery during operation based on a current traction battery temperature and an ambient temperature forecast. The target SOC may be received from the external computing device via the transceiver. The external computing device may include a mobile phone. The expected vehicle travel distance may be learned and/or computed by at least one of the controller and the external computing device based on at least the vehicle trip data. The expected vehicle travel distance may be received via input from the HMI, or a received travel distance may be accepted, rejected, or otherwise modified using the HMI.

A method for controlling charging of an electrified vehicle having a traction battery from an external power source according to one or more embodiments may include, in response to detecting connection of the electrified vehicle to the external power source and an anticipated driving event distance preceding a subsequent battery charging event being less than a maximum driving distance associated with a full charge of the traction battery: estimating temperature of the traction battery during operation of the anticipated driving event; estimating a delta state-of-charge (SOC) based on the estimated temperature of the traction battery and the anticipated driving event distance; calculating a minimum target SOC based on a current SOC and the delta SOC; estimating change of battery health of life (HOL) associated with the delta SOC and the estimated temperature; estimating battery operating efficiency for a plurality of ending SOCs based on the delta SOC and the temperature of the traction battery during operation; calculating a desired ending SOC based on the change of battery HOL and a selected one of the plurality of ending SOCs; calculating a target SOC based on the desired ending SOC and the delta SOC; and charging the traction battery responsive to a current SOC being less than the target SOC. Embodiments may also include receiving the anticipated driving event distance via an HMI of the electrified vehicle and/or calculating the anticipated driving event distance based on a plurality of vehicle driving events.

Embodiments according to the disclosure may include estimating temperature of the traction battery during operation of the anticipated driving event by estimating the temperature based on a current traction battery temperature and an ambient temperature forecast for the anticipated driving event. Embodiments may also include receiving the anticipated driving event distance wirelessly via a transceiver of the electrified vehicle in communication with the controller, and/or transmitting charging data and trip data from the electrified vehicle to an external computing device, which may be implemented by a mobile phone.

One or more embodiments may include a system for controlling electrified vehicle charging having a traction battery configured to be charged from an external power source via a vehicle charger, a transceiver configured to wirelessly transmit vehicle data to an external computer and to wirelessly receive an anticipated distance of driving preceding a subsequent vehicle charging event from the external computer, a human-machine interface (HMI), and a controller in communication with the vehicle charger, the transceiver, and the HMI, the controller configured to control the vehicle charger to charge the traction battery to an optimized ending state-of-charge (SOC) less than a maximum possible SOC based on an estimated temperature of the traction battery during the anticipated distance of driving, a delta SOC to meet propulsive energy for the anticipated distance, depth of discharge effect on a traction battery health of life (HOL) for the delta SOC, and estimated traction battery efficiency during the anticipated distance of driving. The system may also include an external computer configured to receive the vehicle data and to calculate the anticipated distance of driving based on the vehicle data. The controller may replace the wirelessly received anticipated distance of driving with a different anticipated distance of driving in response to input received via the HMI. The controller may be configured to calculate the delta SOC in response to the anticipated distance of driving and the estimated temperature of the traction battery.

Embodiments according to the disclosure may provide one or more advantages. For example, the finishing or ending SOC for a particular charging event may be determined based on customer intended usage distance, battery life model, battery operating efficiency, and temperature rather than charging a high capacity battery to a full charge, which does not consider the impact of SOC levels and charge/discharge cycling on battery life. This may improve battery life in vehicles having high-capacity batteries that are often driven for short distances between charging events.

DETAILED DESCRIPTION

Figure 1:
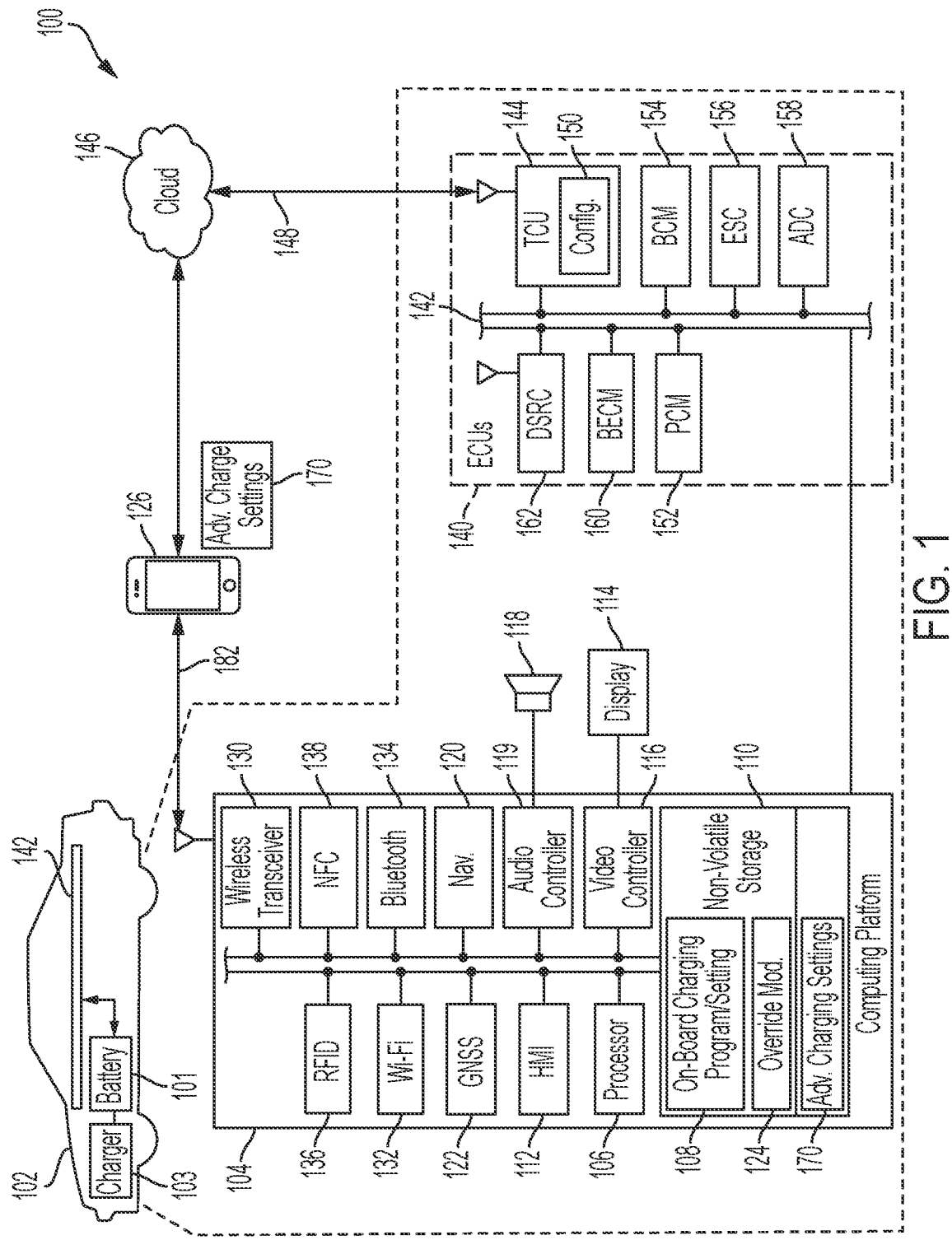
FIG. 1 is a block diagram illustrating representative embodiments of a system or method for intelligent battery charging for an electrified vehicle.

As required, detailed embodiments of the claimed subject matter are disclosed herein. However, it is to be understood that the disclosed embodiments are merely representative of the claimed subject matter and may be embodied in various and alternative forms that may not be explicitly described or illustrated. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

As previously described, electrified vehicle driving range has increased over the last several years due to improvements in battery technology as well as charging strategies and vehicle operation strategies and is anticipated to reach an average of 275 miles by 2022 and 400 miles by 2028. This long range exceeds the daily distance driven by many customers, whether commuting to a work location that may have a charging station, or completing daily local driving and errands. Therefore, it is often unnecessary to charge the battery to full capacity for daily commutes or other local trips. As such, the present disclosure recognizes that long-range electrified vehicles provide the design option of selecting a desired battery SOC charging level.

As generally understood by those of ordinary skill in the art, battery degradation occurs over the life of the vehicle resulting in a decrease of vehicle driving range or distance. For lithium ion batteries that are often used in electrified vehicles, the battery has higher degradation when maintained at higher SOC values compared to maintaining lower SOC values. Similarly, battery degradation is accelerated by deeper charge/discharge cycles when compared to shallower charge/discharge cycles. For example, battery capacity decreases more when the battery is repeatedly cycled from higher SOC level to empty than from a lower SOC level to empty with the same current throughput. In addition, battery SOC also affects battery power capabilities and operating (charging & discharging) efficiency which is related to battery internal resistances. In addition, higher SOC values reduce the battery charge capability, while lower SOC values reduce battery discharge capability.

Overall, battery SOC working range impacts battery decay (including capacity decrease and resistances increase), power capability, and operating efficiency. The present disclosure recognizes that with more long-range electrified vehicles becoming available, intelligent battery charging management based on actual and/or intended vehicle use may satisfy customer needs while extending battery life and improving battery operating efficiency.

In particular, by providing systems and methods for controlling battery charging of long-range or high-capacity vehicles that limit the battery charge SOC level based on a customer's need (which may be obtained from customer inputs or intelligently learned from driving/charging history and preference settings), ambient temperature, degradation properties of the battery and other battery operation properties, battery working efficiency may be improved as well as battery life.

The present disclosure generally provides for a plurality of circuits or other electrical devices. All references to the circuits and other electrical devices, computers, controllers, etc. and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed or configured to perform any number of the functions as disclosed.

The present disclosure describes a system and method for controlling traction battery charging of an electrified vehicle when connected to an external power source via electric vehicle supply equipment (EVSE) configured to receive power from the electric grid or other power source through a plug or wirelessly to charge a vehicle high-voltage traction battery, and is particularly suited for high-capacity or long-range batteries that are often used for less than the maximum distance or range between charging events. The vehicle battery may be controlled to be charged to a voltage corresponding to a desired state of charge using a target, desired state-of-charge (SOC) or similar measure of charge received from a remote or external computer, computing device, or server, or using one or more on-board controllers or processors to calculate or otherwise determine a target SOC based on energy required for an anticipated driving event or events prior to the next charging event.

FIG. 1 illustrates an example system 100 including an electrified vehicle 102 having a traction battery 101 and an associated battery charger 103 configured to access one or more external cloud servers and/or a mobile device to transmit vehicle charging data and trip data and to receive a distance or range for an anticipated driving event. The vehicle 102 generally represents various types of passenger vehicles, such as a crossover utility vehicle (CUV or XUV), a sport utility vehicle (SUV), a truck, a recreational vehicle (RV), etc. including driver operated, driver-assisted, and fully autonomous configurations for transporting people or goods. Vehicle 102 may include a computing platform 104 that provides telematics services including navigation, turn-by-turn directions, vehicle health reports, utility or charging rates, and hands-free calling, for example. In one example, vehicle 102 may include the SYNC system manufactured by The Ford Motor Company of Dearborn, MI. It should be noted that the illustrated system 100 is merely an example, and more, fewer, and/or differently located elements may be provided.

In some embodiments, electrified vehicle 102 may be a battery electric vehicle (BEV) powered only by a high voltage traction battery 101 and one or more electric machines that may be operated as a motor/generator selectively drawing power from or charging high voltage traction battery 101. In other embodiments electrified vehicle 102 may be a hybrid electric vehicle (REV) powered by an internal combustion engine in combination with one or more electric machines that may each operate as a motor and/or generator. In various embodiments, traction battery 101 may be a high-capacity or long-range traction battery that provides a driving range of at least 100 miles when fully charged. For HEV embodiments, the vehicle may have various powertrain configurations including a series hybrid configuration, a parallel hybrid configuration or a parallel/series hybrid configuration, for example. Vehicle 102 may include various types of transmission or gear box configurations including a powersplit configuration, a continuously variable transmission (CVT), or a step-ratio transmission, for example. Control of vehicle charging of an electrified vehicle to an SOC less than a full charge based on anticipated driving distance or range until a subsequent charging events according to the present disclosure is generally independent of the particular type of vehicle or implementation of the particular vehicle powertrain.

As illustrated in FIG. 1, a computing platform 104 may include one or more processors 106 configured to perform instructions, commands, and other routines in support of the processes, functions, or algorithms described herein. For example, the computing platform 104 may be configured to execute instructions of vehicle applications including on-board vehicle charging settings or programming 108 to provide various features as described herein including selectively wirelessly transmitting vehicle data to an external computing device or cloud server for storage and processing to determine an anticipated driving distance and/or target SOC settings 170 and to wirelessly receive the anticipated driving distance, target SOC, and/or various other data as described herein.

Vehicle data and charge data may be transmitted/received from the external computing device or cloud server 146 either directly or from an associated or connected handheld mobile device 126, such as a smart phone for example. Charger control instructions, parameters, or other data 108 may be maintained in a non-volatile or persistent manner using a variety of types of computer-readable storage media 110. The computer-readable media 110 (also referred to as a processor-readable medium or storage) includes any non-transitory medium (e.g., tangible medium) that participates in providing instructions or other data that may be read or accessed by the controller or processor 106 of the computing platform 104 to control charger 103 and associated charging of traction battery 101 when connected to an external power source. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL, for example.

The computing platform 104 may be provided with various features allowing the vehicle occupants/users to interface with the computing platform 104 and to manually enter an anticipated driving distance or range, or accept/reject/modify a proposed driving distance or range automatically learned by the controller or received from the remote computing device, for example. For example, the computing platform 104 may receive input from human-machine interface (HMI) controls 112 configured to provide for occupant interaction with the vehicle 102. As an example, the computing platform 104 may interface with one or more software or hardware buttons (not shown) or other HMI controls configured to invoke functions on the computing platform 104 (e.g., steering wheel audio buttons, a push-to-talk button, instrument panel controls, etc.). In one or more embodiments, HMI 112 may be used to manually enter or select an anticipated driving range or distance before a subsequent charging event, which may include a single trip, or may include multiple trips between charging events. HMI 112 may include one or more video screens or displays to present information from various vehicle sensors to the driver/occupants, such as display 114 or a connected/coupled display of a mobile device 126.

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with a vehicle audio system including one or more speakers 118 configured to provide audio output to vehicle occupants by way of an audio controller 119. One or more microphones may be provided for speech input and processing.

The computing platform 104 may also be provided with navigation and route planning features through a navigation controller 120 configured to calculate navigation routes responsive to user input via e.g., the HMI controls 112, and output planned routes and instructions via the speaker 118 and the display 114. Route planning or actual route/trip data as well as planned and/or actual vehicle charging data may be selectively transmitted to an external cloud server 146 for use in varying adaptive charge settings based on a selected goal. Location data that is utilized for navigation or to determine trip data or charging location may be collected from a global navigation satellite system (GNSS) controller 122 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data. Navigation software may be stored in the storage 110. Alternatively, navigation software and configuration data (e.g. preferences, saved addresses or the like) may be stored individually within the navigation controller 120 provided with non-volatile storage medium (not shown). Location data may also be used to provide anticipated ambient temperatures and to learn or otherwise process vehicle trip data associated with energy consumption, driving habits, driving terrain, traffic, etc. to provide anticipated driving distance/range data and to determine a target or ending SOC as described herein.

The computing platform 104 may be configured to wirelessly communicate with a mobile device 126 of the vehicle users/occupants via a wireless connection 128 through a wireless transceiver 130. The mobile device 126 may be any of various types of portable computing device, such as cellular phones, tablet computers, smart watches, laptop computers, portable music players, or other device having a processor coupled to a memory and configured for communication with the computing platform 104 to communicate vehicle data to the external cloud server 146 and to receive charge settings or data used to calculate charge settings from the external cloud server 146 and communicate the data to the computing platform 104. Alternatively, vehicle computing platform 104 may directly wirelessly communicate with the external cloud server 146 via an associated transceiver 130. The wireless transceiver 130 may be in communication with a Wi-Fi controller 132, a Bluetooth controller 134, a radio-frequency identification (RFID) controller 136, a near-field communication (NFC) controller 138, and other controllers such as a Zigbee transceiver and/or an IrDA transceiver (not shown), and configured to communicate with a compatible wireless transceiver of the mobile device 126.

The computing platform 104 may be further configured to communicate with vehicle controllers that may include various electronic control modules or units (ECUs) 140 via one or more in-vehicle networks 142. The in-vehicle network 142 may include, but is not limited to, one or more of a controller area network (CAN), an Ethernet network, and a media-oriented system transport (MOST), as some examples.

ECUs 140 may include a telematics control unit (TCU) 144 configured to control telecommunication between vehicle 102 and external cloud server 146 through a wireless connection 148 using a modem (not shown). The external cloud server 146 may include one or more servers or computers connected via various types of wired or wireless networks (e.g. the Internet). It is noted that the term cloud is used as a general term throughout the present disclosure and may refer to any cloud-based services involving multiple servers, computers, devices and the like. In various embodiments, external cloud server 146 collects vehicle data and analyzes the data to determine an anticipated driving range or distance and/or a target SOC (less than 100% or full charge) or similar charge settings. External cloud server 146 may use any processing strategies including artificial intelligence (AI), machine learning, neural networks, and the like to process the vehicle trip data and related data to determine the charge settings as described herein. The present disclosure is generally independent of the particular processing strategies.

The TCU 144 may be provided with a local non-volatile storage (not shown) configured to record and store TCU configuration data 150 for the TCU 144. The configuration data 150 may include various data related to the settings of the TCU 144. As a few non-limiting examples, the configuration data 150 may include an identification, network settings to connect to the cloud 146, data package subscriptions, notification preference, vehicle identification data, vehicle battery charge setting compatibility data, or the like.

The ECUs 140 may further include a powertrain control module (PCM) 152 configured to monitor and control the powertrain operation of the vehicle 102. For example, the PCM 152 may be configured to control operation of at least one electric motor to provide propulsive power to the vehicle. Settings and user preferences may be stored in a local storage as PCM configuration data for the PCM 152. In embodiments of electrified vehicles having a step-ratio transmission, PCM 152 may control a shift schedule or shift feel of the transmission.

The ECUs 140 may further include a body control module (BCM) 154 configured to monitor and control chassis or body operations of the vehicle 102. For example, the BCM 154 may be configured to control and monitor vehicle body functions such as door lock/unlock, vehicle occupancy, blind spot monitoring or the like using signals detected via one or more sensors (not shown). Similarly, configurations for the BCM 154 may be stored as BCM configuration data (not shown) in the BCM 154.

The ECUs 140 may further include electronic stability controls (ESC) 156 configured to monitor vehicle operation status using signals from the speed sensor (not shown) and control the stability of the vehicle operation whenever needed such as by activating anti-lock brakes (ABS), traction controls or the like based on the selected vehicle profile. Configurations and settings of the ESC 156 may be stored as ESC configuration data in locally in a non-volatile storage medium. The ECUs 140 may further include an autonomous driving controller (ADC) 158 configured to monitor and control the autonomous driving features of the vehicle 102, which may vary based on the particular application and/or the selected vehicle profile. Autonomous driving features may include lane keep assist, distance from other vehicles, adaptive cruise control, hands-off-wheel alert, autobraking, brake mitigation with multiple sensitivity levels or the like. Configurations and settings of the ADC 158 may be stored as ADC configuration data in a non-volatile storage medium.

The vehicle 102 may be further provided with a battery electronic control module (BECM) 160 to control cell balancing, charging, discharging, and other operations of a vehicle traction battery. BECM 160 may be connected to the in-vehicle network 142 and configured to communicate with various ECUs 140 of the vehicle 102 and collect data therefrom. The BECM may provide data to monitor or calculate a battery health of life (HOL) based on published calculation strategies. The BECM may also measure various battery parameters such as cell voltage, temperature, current, and or resistance to monitor battery operation and performance. The BECM 160 may be connected to the in-vehicle network 142 via a connecting port such as an OBD-II connector (not shown). Alternatively, the one or more ECUs 140, including BECM 160 may be integrated with the computing platform 104 and communicate with the in-vehicle network 142 directly. In one embodiment, BECM 160 controls charging of traction battery 101 in response to detecting connection of the electrified vehicle to an external power source by controlling charging of the vehicle to a target SOC based on an anticipated driving distance and battery temperature as described herein.

The ECUs 140 may further include a dedicated short-range communication (DSRC) controller 162 configured to wirelessly communicate with compatible controllers of other vehicles or digital entities.

In addition to charge settings 108, advanced charge settings 170 may be provided for some applications to enable more advanced features with respect to controlling the charging rate, charging start time, end time, etc. to achieve the target SOC. The particular charge settings 108, 170, as well as the one or more controllers that may be used to implement the charge settings 108, 170, may vary by application and implementation.

As generally illustrated in FIG. 1, an electrified vehicle 102 includes a traction battery 101 configured to be charged from an external power source, a vehicle charger 103 configured to control charging of the traction battery 101 from the external power source, a transceiver 130 configured to wirelessly transmit vehicle trip data to an external computing device, such as mobile phone 126 or cloud 146, a human-machine interface (HMI) 112, and a controller 140 in communication with the vehicle charger 103, the transceiver 130, and the HMI 112, the controller 140 configured to communicate a target state-of-charge (SOC) less than 100% SOC to the vehicle charger 103 during charging of the traction battery 101, the target SOC based on at least an expected vehicle travel distance before a next battery charge from the external power source. The target SOC may be further based on temperature and a traction battery health of life (HOL) estimate. The target SOC may be selected from a minimum target SOC calculated using the anticipated temperature, the expected vehicle travel distance, and a travel distance margin or cushion. The temperature may be an estimated temperature of the traction battery 101 during operation based on a current traction battery temperature and an ambient temperature forecast. The target SOC may be received from the external computing device 126, 146 via the transceiver 130, or TCU 144. The external computing device may include a mobile phone 126. The expected vehicle travel distance may be learned and/or computed by at least one of the controller 140 and the external computing device 126, 146 based on at least the vehicle trip data. The expected vehicle travel distance may be received via input from the HMI 112, or a received travel distance may be accepted, rejected, or otherwise modified using the HMI 112.

As also shown in FIG. 1, one or more controllers 140 are in communication with persistent on-board vehicle memory 110, the vehicle charger 103, the override interface module 124, and the HMI 112 to selectively control the vehicle charger 103 using a determined target SOC less than a full charge SOC as described herein. External cloud server 146 may determine an anticipated driving distance and/or target SOC, or may provide data to controller 140 for determination of the target or ending SOC based on historical vehicle trip data and/or traction battery charging data received by the external cloud server 146 from the electrified vehicle 102.

Figure 2:
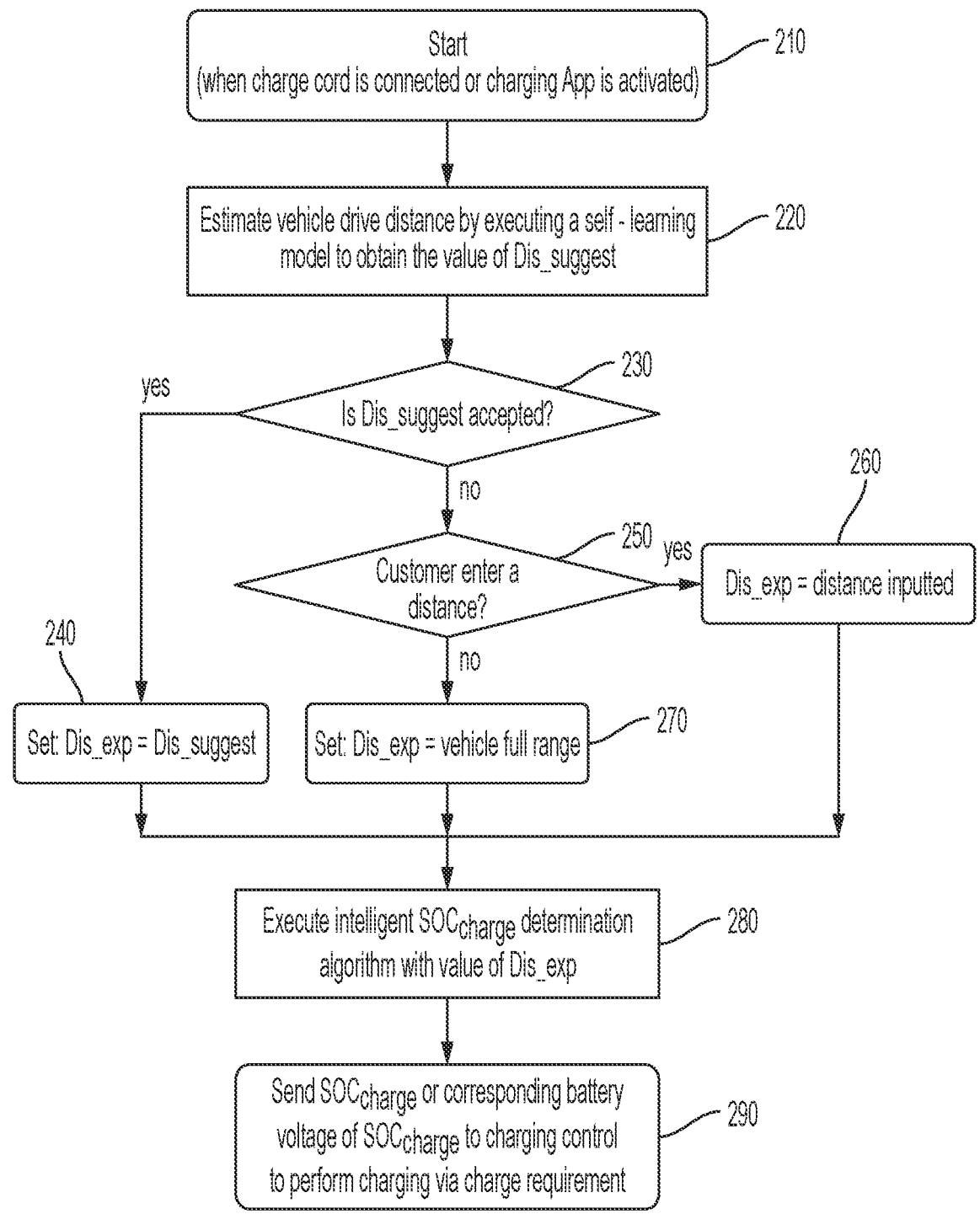
FIG. 2 is a flow chart illustrating operation of representative embodiments of a system or method for intelligent battery charging for an electrified vehicle.
Figure 3:
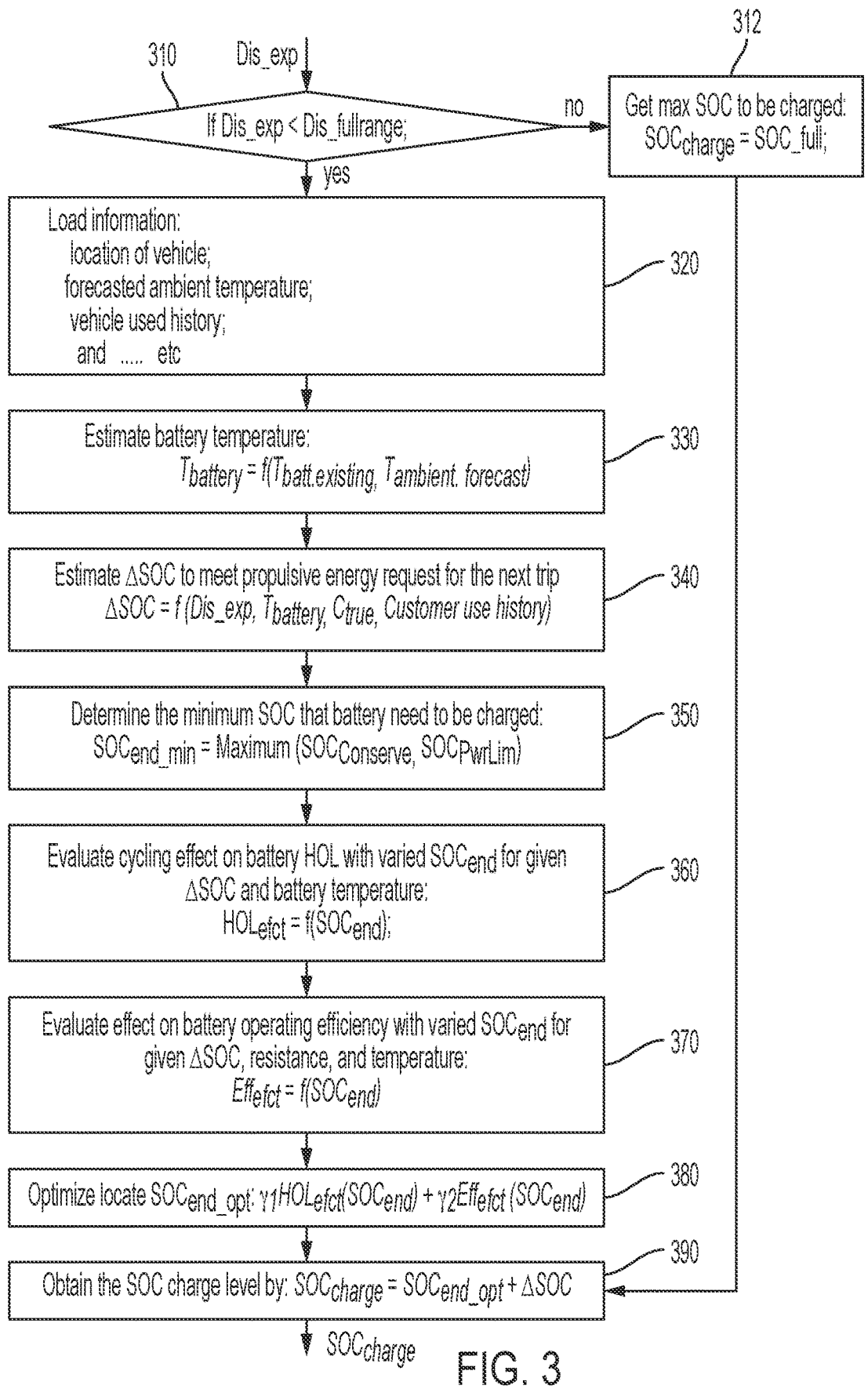
FIG. 3 is a flow chart illustrating representative embodiments of a system or method for determining a target SOC for charging of an electrified vehicle.

FIGS. 2 and 3 are flow charts illustrating operation of representative embodiments of a system or method for intelligent battery charging for an electrified vehicle. The processes, methods, algorithms, or logic disclosed can be deliverable to or implemented by an on-board vehicle or remote/external processing device, controller, or computer, which can include any existing programmable electronic control unit or dedicated electronic control unit or circuitry. Similarly, the processes, methods, or algorithms can be stored as data and instructions executable by a controller or computer in many forms including, but not limited to, information permanently stored on non-writable storage media such as ROM devices and information alterably stored on writeable storage media such as flash memory, magnetic tapes or disks, optical tape or disks, RAM devices, and other magnetic, optical, and combination media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

With regard to the operation of the functions, processes, systems, methods, etc. described herein, it should be understood that, although the steps of such processes, etc. may be described as occurring according to a certain ordered sequence, such processes could be practiced with the described functions or steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to import limitations to the claimed subject matter other than the explicit limitations found therein.

The flowchart of FIG. 2 illustrates a representative embodiment for intelligent charging of a vehicle having a high-capacity or long-range battery at a high level. As shown, the logic is started at 210 in response to the vehicle charging cord being connected to an external power source (via cable, or wirelessly/inductively), or in response to activation of a corresponding charging APP as initiated by the vehicle HMI or on a connected mobile device or external computer or server. An estimated or anticipated driving distance or range before a subsequent charging event is then calculated or otherwise determined by a vehicle controller, or determined by an external computing device and communicated to the vehicle as indicated at 220. The vehicle HMI may display the estimated vehicle travel distance (defined as Dis_suggest in this example), which may be intelligently learned from the vehicle operation history and customer preference. The customer may accept the value for Dis_suggest as represented at 230, 240, enter a new value for the anticipated driving distance at 250, 260, or select to use the full range distance as the expected vehicle travel distance, (defined as Dis_exp) at 270. The Dis_exp value will be used to determine a desired battery charge level or target/ending SOC at 280 to provide sufficient battery power and energy in the selected distance of the next trip(s) for the vehicle with less battery cycling degradation and better operation efficiency as described in greater detail herein. The target SOC ($SOC_{charge}$ in this example) or corresponding battery voltage is then used by one or more of the vehicle controllers and battery charger to charge the battery to the target.

In one embodiment, a self-learning model is used to provide the value of Dis_suggest based on history data about customer daily per charge travel distance and time when the vehicle is used and charged. As an example of the self-learning model, the vehicle drive distance per charge can be classified into clusters based on days of vehicle use such as Monday, Tuesday, . . . Sunday. When the self-learning model or algorithm is called, it first determines which the day(s) between the current charging event and the next anticipated charging event and identifies which cluster will be used to determine the anticipated or estimated driving distance. The driving distance can be simply determined via statistical analysis, such as $90^{th}$ percentile or ($99^{th}$ percentile) of travel distance of the corresponding cluster, for example. Of course, more complex learning models can be developed, considering more information such as vehicle location, regular travel routes, terrain, traffic, the time that the vehicle is charged and used, etc. Forget (or decay) filters may be used to filter the history data to make the Dis_suggest weighted more on the most recent vehicle use information.

FIG. 3 is a flowchart illustrating operation of a system or method for controlling vehicle charging with respect to representative strategies for determine a target battery charge for a particular anticipated driving distance. At 310, a determination is made with respect to whether the anticipated driving distance (Dis_exp) before a subsequent charging event is less than the driving distance for a full battery charge (Dis_fullrange), which may correspond to 100% SOC or a designed maximum SOC level that the battery is charged to during charging (different maximum SOC levels may be used depending on charge current or types of charging such as fast charge, level 2 charge, etc.). If the distance exceeds the full range distance, then the target SOC is set to SOC_full as indicated at 312. Otherwise, additional vehicle/trip data may be obtained such as location of the vehicle (for power/energy consumption estimation), current battery temperature, ambient temperature forecast, vehicle usage history, etc. as indicated at 330.

A battery thermal model stored in the vehicle computing platform or existing outside the system may be used to estimate battery temperature range for next drive based on battery existing temperature ($T_{batt.existing}$), ambient temperature forecast ($T_{ambient.forecast}$) and vehicle operation history as illustrated at 330. The system may then estimate the discharge depth of SOC, ($\Delta SOC$), for the anticipated travel distance (Dis_exp) based on battery true capacity at the present time ($C_{true}$), which can be received from the BECM, and based on the vehicle/trip information obtained or calculated in steps 320, 330. The $\Delta SOC$ is the difference of SOC to be provided from starting of the charge event to ending of the charge event ($SOC_{charge}$) through this charging, and the anticipated SOC ($SOC_{end}$) at the end of the next trip(s) according to the customer use history data stored in the controller. This $\Delta SOC$ represents the range of SOC to be consumed to meet the propulsive energy request for the next trip, and may include various anticipated losses and accessory consumption depending on the particular implementation. The change or delta SOC may be a function of the anticipated driving distance, current true battery capacity, estimated battery temperature, and customer use history or historical trip information as generally at represented at 340 by:

$$\Delta SOC = f(\text{Dis\_exp}, T_{battery}, C_{true}, \text{Customer use history})$$

Figure 5:
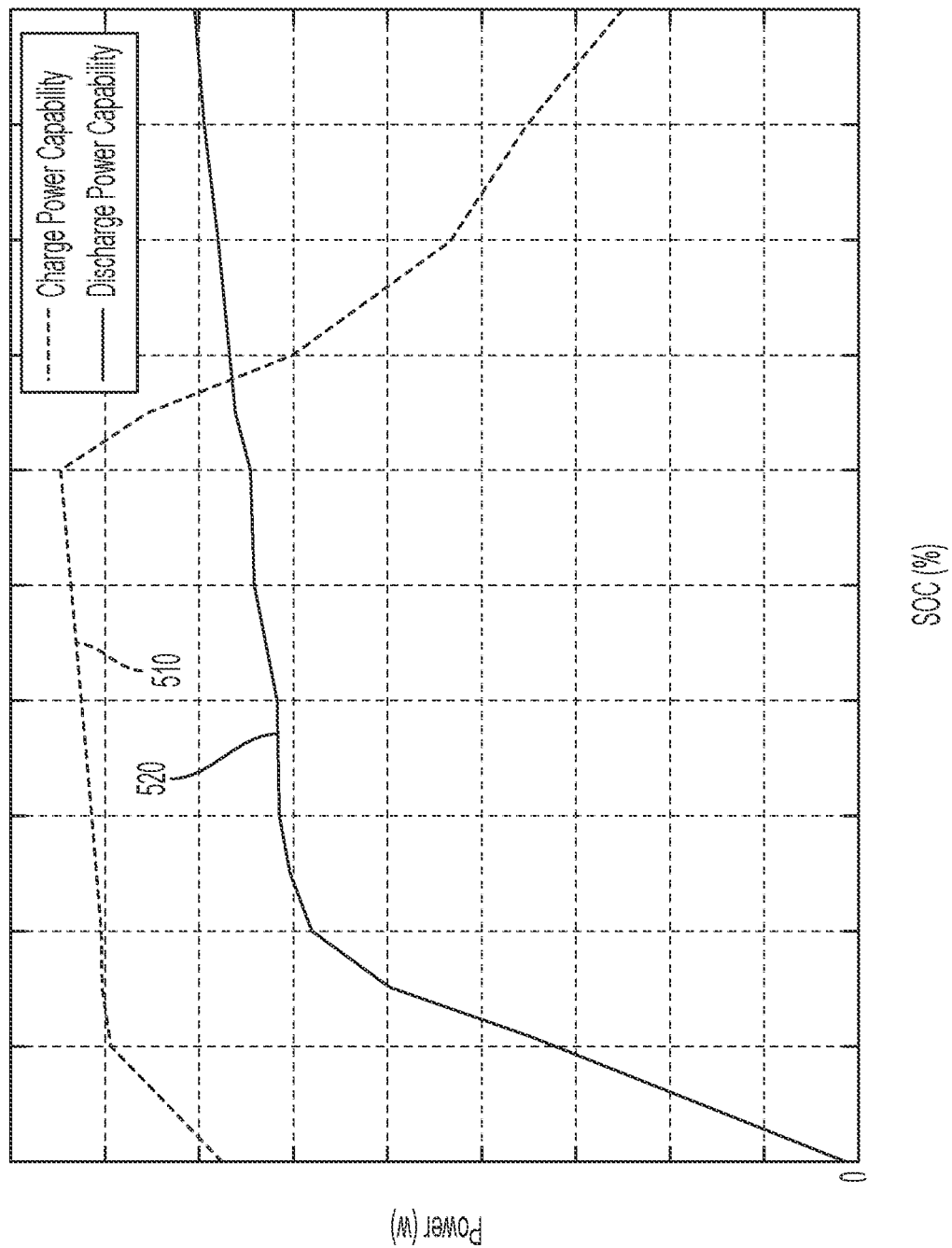
FIG. 5 is a graph illustrating battery power as a function of SOC, demonstrating the effects on battery charge/discharge capability.

At 350, the system determines a $SOC_{end\_min}$, value which is the minimum SOC to be finished at the end of the next trip, considering: a) SOC to provide a predetermined discharge power for the vehicle, $SOC_{PwrLim}$=f(Pwr_dischLimit, $T_{ambient.forecast}$), at the anticipated temperature, which as shown in FIG. 5, battery discharge power will be dramatically dropped if battery SOC is below a certain value; and b) SOC to provide a travel distance margin or cushion, similar to the fuel level determined for a low fuel warning on conventional vehicles, such as an SOC to provide enough energy for 30 miles (or more depending on the customer's comfort level) of travel. This value is represented as $SOC_{Conserve}$. The ending value is then determined by the maximum SOC of the two considerations above, as generally represented at 350 and by:

$$SOC_{end\_min} = \text{Maximum}(SOC_{Conserve}, SOC_{PwrLim})$$

The system may then evaluate the effect for the given $\Delta SOC$ at estimated battery temperature on battery heath of life (HOL) for each of a plurality of different $SOC_{end}$ values for the next drive as represented at 360. The battery cycling degradation depends on the cycling depth, ΔSOC, and the SOC swing range when working temperature and RMS current are the same. The effect on battery HOL for a cycling with SOC swings in range [$SOC_{end}$, $SOC_{end}+\Delta SOC$] with a specified ΔSOC can be evaluated with a function of $SOC_{end}$ (expressed as $HOL_{efct}(SOC_{end})$), and $SOC_{end}$ is within range of [$SOC_{min}$, ($SOC_{full}-\Delta SOC$)]. The value of $HOL_{efct}(SOC_{end})$ or parameters of the function can be calibrated off board via ranges of ΔSOC, temperature, and current. The higher value represents lower battery degradation. The system will call a $HOL_{efct}$ model or lookup an existing table to get the relation of $HOL_{efct}$ with $SOC_{end}$ when the battery is charged from current SOC to $SOC_{end}+\Delta SOC$, and discharged to $SOC_{end}$ with $SOC_{end}$ varying from $SOC_{end\_min}$ to ($SOC_{full}-\Delta SOC$) with received swing depth ΔSOC and other information e.g. temperature and current.

At 370, the system may evaluate the effect on battery operating efficiency with varied $SOC_{end}$ values for a given ΔSOC, resistance, and temperature. The battery operating efficiency depends on battery charge and discharge resistances, which depend on battery SOC and temperature as represented by:

$$Eff_{batt}=f(R_{charge}(SOC,T_{battery}),R_{discharge}(SOC,T_{battery}),I)$$

The $Eff_{batt}$ will provide information of battery working efficiency when battery is charged from existing SOC to the level $SOC_{end}+\Delta SOC$, and then discharged to $SOC_{end}$ with the estimated charge and discharge currents at expected battery temperature. When ΔSOC is determined, the variation of $R_{charge}$ and $R_{discharge}$ along with the changes of $SOC_{end}$ is known therefore, the effect of $SOC_{end}$ on $Eff_{batt}$ is known as well. This effect can be expressed as a function (or table) e.g. $Eff_{efct}(SOC_{end})$ in the range [$SOC_{end\_min}$, ($SOC_{full}-\Delta SOC$)]. The value of $Eff_{efct}(SOC_{end})$ or parameters of the function can be calibrated off board via ranges of ΔSOC, temperature and current. The higher value of $Eff_{efct}$ reflect the relative higher battery efficiency.

The system may call an $Eff_{efct}$ model or lookup an existing table to get the relationship between $Eff_{efct}$ and $SOC_{end}$ when the battery is charged from a current SOC to the level $SOC_{end}+\Delta SOC$, over the range of $SOC_{end}$ varying from $SOC_{end\_min}$ to ($SOC_{full}-\Delta SOC$) with received swing depth ΔSOC and other information e.g. temperature and current.

At 380, the system determines a desired or optimal ending SOC value by optimization of a cost function:

$$J=\gamma_1 HOL_{efct}(SOC_{end})+\gamma_2 Eff_{efct}(SOC_{end})$$

with $SOC_{end\_opt}$=arg max (J) subject to SOC belonging to the set of [$SOC_{end}$, $SOC_{end}+\Delta SOC$] and constrained by $SOC_{end} \geq SOC_{end\_Min}$.

The SOC charge level may then be determined at 390 according to:

$$SOC_{charge}=SOC_{end\_opt}+\Delta SOC$$

The target $SOC_{charge}$ will be sent to the battery charger control directly or be converted to a cell voltage which will be sent to the battery charging control.

With the proposed battery charging management systems and methods according to the present disclosure, the controls can smartly determine a target SOC for charging a high-capacity or long-range battery based on customer intended usage range, battery life model, battery operating efficiency and temperature.

Figure 4:
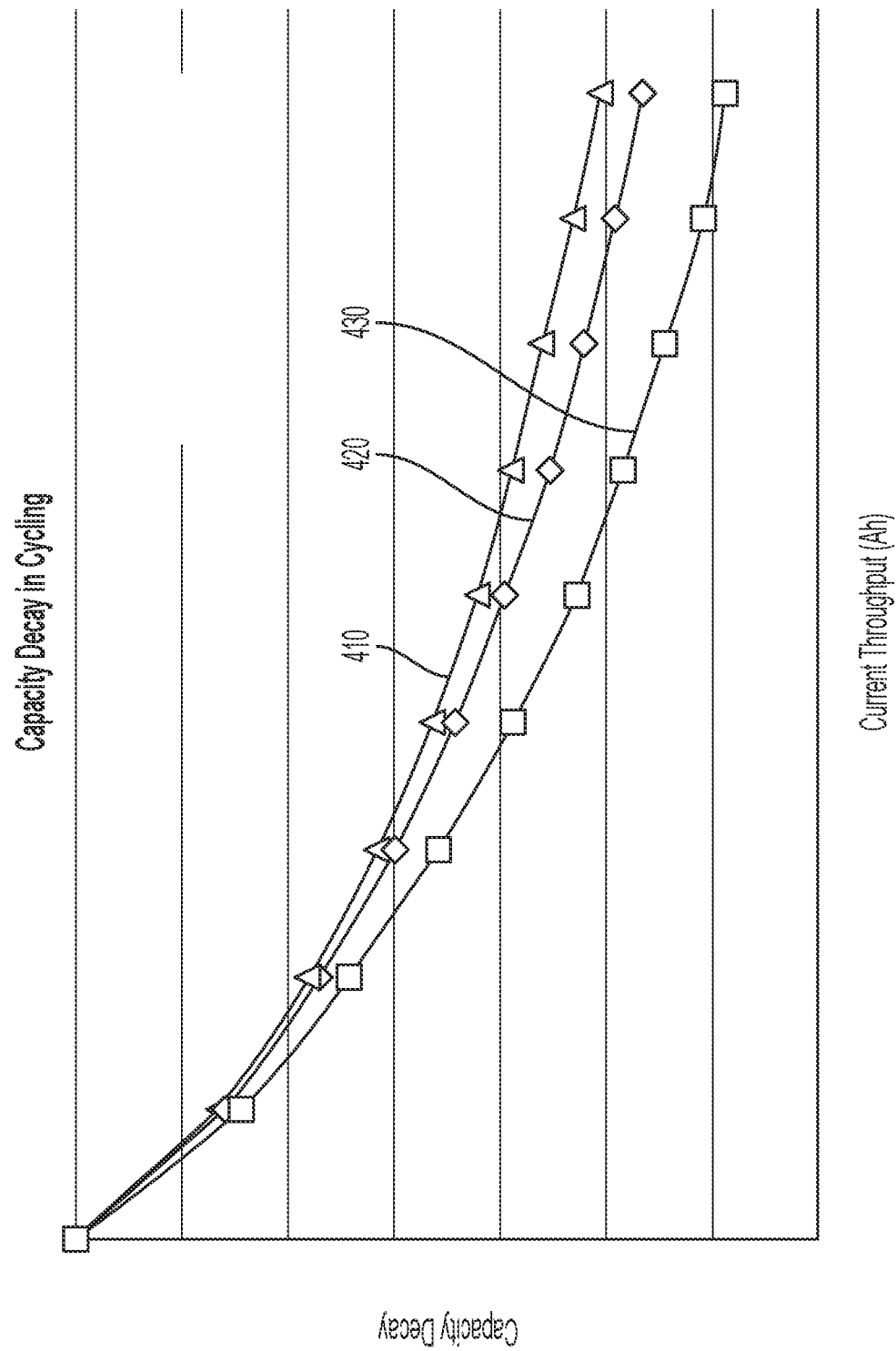
FIG. 4 is a graph illustrating battery capacity decay as a function of battery current throughput, demonstrating possible improvements associated with controlling depth of discharge or cycling using a target SOC according to one or more embodiments.

FIG. 4 shows the relationship of battery capacity decay vs. current throughput with different depths of discharge (DOD) represented by lines 410, 420, and 430 for the same charge/discharge current rate under same temperature. It can be seen that the battery capacity decreases more when cycling from higher SOC level to a minimum SOC than from a lower SOC level to a minimum SOC with the same current throughput. Embodiments according to the present disclosure may improve battery life as demonstrated by the data of FIG. 4 by comparing different charging levels. For example, assume a first vehicle is charged full ($SOC_{full}$) from depletion ($SOC_{min}$) every time the vehicle is charged as represented by line 430. Compare a second vehicle that is charged to a mid-range capacity ($SOC_{mid}$) less than the maximum capacity from depletion ($SOC_{min}$) every time the vehicle is charged as represented by line 420. Finally, compare a third vehicle that is charged to less than maximum capacity based on an anticipated driving distance to a target ($SOC_{low}$) less than maximum capacity from depletion ($SOC_{min}$) every time the vehicle is charged as represented by line 410. The other conditions of vehicle applications are assumed the same for comparison so the battery will have the same energy throughput for the same time period. From FIG. 4, it is apparent that the third vehicle that charges to a target SOC of about $SOC_{low}$ (shallow depth of charge/discharge relative to vehicle 1) has about 17% less capacity decay than that of the first vehicle. This results in the third vehicle's range being about 20% more than that of the first vehicle. Therefore, the proposed charging control can increase battery life and operating efficiency, and significantly reduce EV range decrease of a BEV over the life of the battery.

In addition, battery SOC also affects battery power capabilities and operating (charging & discharging) efficiency which is related to battery internal resistances. For the same temperature, usually at lower SOC, the battery has higher resistance (working efficiency becomes lower). The effect of SOC on battery power capabilities is shown in FIG. 5. Higher SOC reduces the battery charge capability represented by line 510, and lower SOC reduces battery discharge capability as represented by line 520.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrified vehicle, comprising:
   a traction battery configured to be charged from an external power source;
   a vehicle charger configured to control charging of the traction battery from the external power source;
   a transceiver configured to wirelessly transmit vehicle trip data to an external computing device;
   a human-machine interface (HMI); and
   a controller in communication with the vehicle charger, the transceiver, and the HMI, the controller configured to communicate a target state-of-charge (SOC) less than 100% SOC to the vehicle charger during charging of the traction battery, the target SOC based on at least an expected vehicle travel distance before a next battery charge from the external power source.

2. The electrified vehicle of claim 1 wherein the target SOC is further based on temperature and a traction battery health of life (HOL) estimate, and vehicle use history.

3. The electrified vehicle of claim 2 wherein the target SOC is selected from a minimum target SOC calculated to provide a predetermined discharge power for the vehicle and a travel distance margin or cushion, and a delta SOC depletion range for the expected vehicle travel distance, and wherein the target SOC is calculated based on a change in estimated HOL calculated using an ending SOC equal to or above the minimum target SOC and the delta SOC depletion range.

4. The electrified vehicle of claim 2 wherein the temperature comprises an estimated temperature of the traction battery during operation based on a current traction battery temperature, and an ambient temperature forecast.

5. The electrified vehicle of claim 1 wherein the target SOC is received from the external computing device via the transceiver.

6. The electrified vehicle of claim 5 wherein the external computing device comprises a mobile phone.

7. The electrified vehicle of claim 1 wherein the expected vehicle travel distance is computed by at least one of the controller and the external computing device based on at least the vehicle trip data.

8. The electrified vehicle of claim 1 wherein the expected vehicle travel distance is received via input from the HMI.

9. The electrified vehicle of claim 1 wherein the controller is further configured to:
   estimate a delta state-of-charge (SOC) based on an estimated temperature of the traction battery during the expected vehicle travel distance before a next battery charge from the external power source; and
   calculate the target SOC based on the delta SOC.

10. The electrified vehicle of claim 9 wherein the controller is configured to receive the expected driving event distance via the HMI.

11. The electrified vehicle of claim 10 wherein the controller is configured to receive the estimated temperature of the traction battery via the transceiver.

12. The electrified vehicle of claim 11 wherein the controller is further configured to receive the target SOC via the transceiver, wherein the target SOC is based on an estimated change of battery health of life (HOL) associated with the delta SOC and the estimated temperature for a plurality of ending SOCs.

13. The electrified vehicle of claim 11 wherein the delta SOC is further based on:
   an estimated battery operating efficiency for the plurality of ending SOCs based on the delta SOC and the temperature of the traction battery during operation.

14. The electrified vehicle of claim 13 wherein the delta SOC is further based on:
   a desired ending SOC calculated based on the change of battery HOL and a selected one of the plurality of ending SOCs.

15. The electrified vehicle of claim 14 wherein the controller is further configured to transmit, via the transceiver charging data and trip data from the electrified vehicle to an external computing device.

* * * * *